(12) United States Patent
Lee et al.

(10) Patent No.: US 7,572,866 B2
(45) Date of Patent: Aug. 11, 2009

(54) SLURRY PHASE POLYMERISATION PROCESS

(75) Inventors: Stephen Kevin Lee, London (GB); Brent R. Walworth, Sint-Niklaas (BE); Daniel Marissal, Carry le Rouet (FR)

(73) Assignee: Ineos Manufacturing Belgium NV, Antwerpen (BE)

( * ) Notice: Subject to any disclaimer, the term of this patent is extended or adjusted under 35 U.S.C. 154(b) by 0 days.

(21) Appl. No.: 11/667,018

(22) PCT Filed: Nov. 22, 2005

(86) PCT No.: PCT/GB2005/004487

§ 371 (c)(1),
(2), (4) Date: Jun. 9, 2008

(87) PCT Pub. No.: WO2006/056763

PCT Pub. Date: Jun. 1, 2006

(65) Prior Publication Data

US 2008/0262171 A1    Oct. 23, 2008

(30) Foreign Application Priority Data

Nov. 26, 2004    (GB) ................. 0426057.6

(51) Int. Cl.
   *C08F 2/12*    (2006.01)
   *B01J 19/18*    (2006.01)
   *C08F 10/02*    (2006.01)
(52) U.S. Cl. .................. 526/64; 526/918; 422/132
(58) Field of Classification Search .................. 526/64, 526/918; 422/132
   See application file for complete search history.

(56) References Cited

U.S. PATENT DOCUMENTS

| | | | |
|---|---|---|---|
| 3,172,737 A | 3/1965 | Whittington | |
| 3,203,766 A | 8/1965 | Mudd et al. | |
| 3,242,150 A | 3/1966 | Scoggin | |
| 3,248,179 A | 4/1966 | Norwood | |
| 3,257,362 A | 6/1966 | Norwood | |
| 3,293,000 A | 12/1966 | Marwil | |
| 3,324,093 A | 6/1967 | Alleman | |
| 4,121,029 A | 10/1978 | Irvin et al. | |
| 4,613,484 A | 9/1986 | Ayres et al. | |
| 4,794,151 A | 12/1988 | Mueller-Mall et al. | |
| 5,484,862 A * | 1/1996 | Siddall et al. .................. 526/88 | |
| 5,565,175 A | 10/1996 | Hottovy et al. | |
| 6,204,344 B1 | 3/2001 | Kendrick et al. | |
| 6,239,235 B1 | 5/2001 | Hottovy et al. | |
| 6,281,300 B1 | 8/2001 | Kendrick | |
| 6,319,997 B1 | 11/2001 | Kendrick et al. | |
| 6,369,173 B1 | 4/2002 | Kim et al. | |
| 6,420,497 B1 | 7/2002 | Kufeld et al. | |
| 6,664,352 B1 | 12/2003 | Fredriksen et al. | |
| 6,670,431 B2 | 12/2003 | Kendrick et al. | |
| 6,743,869 B2 | 6/2004 | Franklin, III et al. | |
| 6,800,698 B2 | 10/2004 | Kendrick et al. | |
| 6,806,324 B2 | 10/2004 | Hottovy et al. | |
| 6,815,511 B2 | 11/2004 | Verser et al. | |
| 6,818,186 B2 | 11/2004 | Burns et al. | |
| 6,833,415 B2 | 12/2004 | Kendrick et al. | |
| 6,858,682 B2 | 2/2005 | Kendrick et al. | |
| 6,908,971 B2 | 6/2005 | Burns et al. | |
| 6,926,868 B2 | 8/2005 | Kendrick et al. | |
| 7,014,821 B2 | 3/2006 | Hottovy et al. | |
| 7,015,289 B2 | 3/2006 | Hottovy et al. | |
| 7,033,545 B2 | 4/2006 | Kufeld et al. | |
| 7,034,090 B2 | 4/2006 | Kendrick | |
| 7,268,194 B2 | 9/2007 | Kendrick et al. | |
| 2002/0111441 A1 | 8/2002 | Kendrick et al. | |
| 2002/0182121 A1 | 12/2002 | Kendrick | |
| 2002/0187081 A1 | 12/2002 | Hottovy et al. | |
| 2003/0012705 A1 | 1/2003 | Hottovy et al. | |
| 2003/0023010 A1 | 1/2003 | Hottovy et al. | |
| 2003/0027944 A1 | 2/2003 | Hottovy et al. | |
| 2003/0050409 A1 | 3/2003 | Hottovy et al. | |
| 2003/0083444 A1 | 5/2003 | McElvain et al. | |
| 2003/0092856 A1 | 5/2003 | Hottovy et al. | |
| 2003/0109651 A1 | 6/2003 | Kufeld et al. | |

(Continued)

FOREIGN PATENT DOCUMENTS

EP    0 432 555 A2    6/1991

(Continued)

OTHER PUBLICATIONS

Sato, Y., et al; "Flow Pattern, Circulation Velocity and Pressure Loss in Loop Reactor"; *Journal of Chemical Engineering of Japan*; vol. 12, No. 6; pp. 448-453 (1979).

(Continued)

*Primary Examiner*—Fred M Teskin
(74) *Attorney, Agent, or Firm*—Nixon & Vanderhye

(57) ABSTRACT

A process comprising polymerizing an olefin monomer optionally together with an olefin comonomer in the presence of a polymerization catalyst in a diluent in a loop reactor which comprises at least 2 horizontal sections and at least 2 vertical sections to produce a slurry comprising solid particulate olefin polymer and the diluent wherein the Froude number in at least 20% of the length of the vertical sections of the reactor loop is less than 85% of the Froude number in at least 20% of the length of the horizontal sections of the loop is disclosed.

15 Claims, No Drawings

U.S. PATENT DOCUMENTS

| | | |
|---|---|---|
| 2003/0191251 A1 | 10/2003 | McGrath |
| 2004/0136881 A1 | 7/2004 | Verser et al. |
| 2004/0192860 A1 | 9/2004 | Hattovy et al. |
| 2004/0198928 A1 | 10/2004 | Kendrick et al. |
| 2005/0186126 A1 | 8/2005 | Burns et al. |
| 2007/0078237 A1 | 4/2007 | McElvain et al. |
| 2007/0274873 A1 | 11/2007 | Kendrick et al. |

FOREIGN PATENT DOCUMENTS

| | | |
|---|---|---|
| EP | 0 432 555 A3 | 6/1991 |
| EP | 0 891 990 A2 | 1/1999 |
| EP | 891990 A2 | 1/1999 |
| EP | 891 990 A3 | 11/1999 |
| EP | 891 990 B1 | 9/2004 |
| WO | WO 00/22011 | 4/2000 |
| WO | WO 00/22011 A2 | 4/2000 |
| WO | WO 00/22011 A3 | 4/2000 |
| WO | WO 02/28922 | 4/2002 |
| WO | WO 03/039739 | 5/2003 |
| WO | WO 2004/024780 | 3/2004 |
| WO | WO 2004/024781 | 3/2004 |
| WO | WO 2004/024782 A2 | 3/2004 |
| WO | WO 2004/024782 A3 | 3/2004 |
| WO | WO 2004/027264 A2 | 4/2004 |
| WO | WO 2004/027264 A3 | 4/2004 |
| WO | WO 2005/044871 | 5/2005 |
| WO | WO 2005/077994 | 8/2005 |
| WO | WO 2006/003144 | 1/2006 |

OTHER PUBLICATIONS

SRI International Supplement D, Report No. 19D (1989).

International Standard; Plastics—Methods for determining the density of non-cellular plastics—Part 1: Immersion method, liquid pyknometer method and titration method; ISO 1183-1; First Edition Feb. 1, 2004.

Abstract, Process Economics Program Report 19E; "Biomodal Linear Low-Density Polyethylene", 137 pgs (Nov. 1999).

Abstract, Process Economics Program Report 19F; "Supercritical Loop Reactor Slurry Process for Producing Polyethylene and Polypropylene", 134 pgs (Jun. 1996).

Abstract, Process Economics Program Report No. 19C; "High Density Polyethylene", 300 pgs. (Undated).

Magovern, Robert L.; Process Economics Program; Report No. 19; "Linear Polyethylene and Polypropylene", 350 pgs (Nov. 1966).

Magovern, Robert L.; Process Economics Program; Report No. 19-A; "Linear Polyethylene and Polypropylene Supplement A", 222 pgs (Oct. 1969).

Magovern, Robert L.; Process Economics Program; Report No. 19B; "Linear Polyethylene and Polypropylene Supplement B"; 169 pgs (Feb. 1974).

* cited by examiner

SLURRY PHASE POLYMERISATION PROCESS

This application is the U.S. National Phase of International Application PCT/GB2005/004487, filed 22 Nov. 2005, which designated the U.S. PCT/GB20051004487 claims priority to British Application No. 0426057.6 filed 26 Nov. 2004. The entire content of these applications are incorporated herein by reference.

The present invention is concerned with olefin polymerisation in slurry or suspension phase loop reactors.

BACKGROUND OF THE INVENTION

Slurry phase polymerisation of olefins is well known wherein an olefin monomer and optionally olefin comonomer are polymerised in the presence of a catalyst in a diluent in which the solid polymer product is suspended and transported.

This invention is specifically related to polymerisation in a loop reactor where the slurry is circulated in the reactor typically by means of a pump or agitator. Liquid full loop reactors are particularly well known in the art and are described for example in U.S. Pat. Nos. 3,152,872, 3,242,150 and 4,613,484.

Polymerisation is typically carried out at temperatures in the range 50-125° C. and at pressures in the range 1-100 bara. The catalyst used can be any catalyst typically used for olefin polymerisation such as chromium oxide, Ziegler-Natta or metallocene-type catalysts. The product slurry comprising polymer, and diluent, and in most cases catalyst, olefin monomer and comonomer can be discharged intermittently or continuously, optionally using concentrating devices such as hydrocyclones or settling legs to minimise the quantity of fluids withdrawn with the polymer.

The loop reactor is of a continuous tubular construction comprising at least two, for example four, vertical sections and at least two, for example four, horizontal sections. The heat of polymerisation is typically removed using indirect exchange with a cooling medium, preferably water, in jackets surrounding at least part of the tubular reaction loop. The volume of the loop reactor can vary but is typically in the range 20 to 120 m³ the loop reactors of the present invention are of this generic type.

Maximum commercial scale plant capacities have increased steadily over the years. Growing operating experience over the last few decades has led to operation of increasingly high slurry and monomer concentrations in reaction loops, the increase in slurry concentrations has typically been achieved with increased circulation velocities achieved for example by higher reactor circulation pump head or multiple circulation pumps as illustrated by EP 432555 and EP 891990. The increased velocity and head requirement has led to increasing energy consumption as slurry concentrations increase. Despite increased operating experience the volume of individual polymerisation reactors has also needed to be increased to accommodate the desired production capacity. Construction and commissioning of new commercial plants is very expensive and therefore new designs seek to achieve any required scale-up in capacity whilst changing parameters that present minimum risk to the successful operation of the new unit. Typically reactor loop volume has been increased by adding legs and/or length to existing reactor loops or even by linking two existing loops together whilst maintaining the reactor loop internal diameter at about 24" (600 millimeters) or below. The increase in reaction loop volume by increasing length at a fixed diameter leads to steadily increasing absolute (and even specific) loop pressure drops (and therefore power consumption).

Increasing the diameter of commercial scale reactors to increase reactor volume has been seen as giving greater scale-up risk than that associated with increasing length. The increased risk has been associated with concerns over maintenance of good thermal, compositional and particle distribution across the reactor cross-section without excessively increasing turbulence (e.g. circulation velocity) and associated pressure drop/power in the polymerisation loop. Inadequate cross-sectional distribution could lead to increased fouling, reduced heat transfer and reduced polymer productivity and homogeneity.

In addition, reactors are typically designed and constructed with a constant internal diameter around the entire loop, except for example where fittings, such as the circulation pumps, dictate a different (larger or smaller) diameter at a specific location for a particular reason. There would have been an expectation that varying the internal diameter between for example the vertical and horizontal sections would lead to fouling problems. We have found that this is not the case.

DESCRIPTION OF THE INVENTION

In accordance with the present invention there is provided a process comprising polymerising an olefin monomer optionally together with an olefin comonomer in the presence of a polymerisation catalyst in a diluent in a loop reactor which comprises at least 2 horizontal sections and at least 2 vertical sections to produce a slurry comprising solid particulate olefin polymer and the diluent wherein the Froude number in at least 20% of the length of the vertical sections of the reactor loop is less than 85% of the Froude number in at least 20% of the length of the horizontal sections of the loop.

Advantages of the invention are that the residence time of a given length of reactor is increased while simultaneously minimising any increase in risk of reactor fouling. The invention enables design and operation of vertical slurry loop reactors with reduced total and specific energy consumption.

This invention relates to a method and apparatus for continuous polymerization of olefins, preferably alpha mono olefins in a vertical elongated tubular loop reaction zone. The olefin(s) is continuously added to, and contacted with, a catalyst in a hydrocarbon diluent. The monomer(s) polymerise to form a slurry of solid particulate polymer suspended in the polymerisation medium or diluent. In particular, the invention is related to a process where the Froude number varies around the loop The Froude number is a dimensionless parameter indicative of the balance between the suspension and settling tendencies of particles in a slurry. It provides a relative measure of the momentum transfer process to the pipe wall from particles compared to the fluid. Lower values of the Froude number indicate stronger particle-wall (relative to fluid-wall) interactions. The Froude number (Fr) is defined as $V^2/(g(s-1)D)$ where v is the average velocity of the slurry, g Is the gravitational constant, s is the specific gravity of the solid in the diluent and D is the internal pipe diameter. The specific gravity of the solid polymer which is the ratio of the density of the polymer to the density of the suspending medium is based on the annealed density of the degassed polymer after being substantially devolatilised and immediately prior to any extrusion as measured using method ISO1183A.

The Froude number in at least 20% of the length of the vertical sections of the reactor loop is less than 85% of the Froude number in at least 20% of the length of the horizontal sections of the loop The average Froude number in the loop will preferably be maintained at or below 20, for example in the range 20 to 1 preferably in the range 15 to 2, more preferably in the range 10 to 3.

Typically, in the slurry polymerisation process of polyethylene, the slurry in the reactor will comprise the particulate polymer, the hydrocarbon diluent(s), (co) monomer(s), catalyst, chain terminators such as hydrogen and other reactor additives. In particular the slurry will comprise 20-75, preferably 30-70 weight percent based on the total weight of the slurry of particulate polymer and 80-25, preferably 70-30 weight percent based on the total weight of the slurry of suspending fluid, where the suspending medium is the sum of all the fluid components in the reactor and will comprise the diluent, olefin monomer and any additives; the diluent can be an inert diluent or it can be a reactive diluent in particular a liquid olefin monomer where the principal diluent is an inert diluent the olefin monomer will typically comprise 2-20, preferably 4-10 weight percent of the slurry.

The solids concentration in the slurry in the reactor will typically be above 20 volume %, preferably about 30 volume %, for example 20-40 volume %, preferably 25-35 volume % where volume % is [(total volume of the slurry−volume of the suspending medium)/(total volume of the slurry)]×100. The solids concentration measured as weight percentage which is equivalent to that measured as volume percentage will vary according to the polymer produced but more particularly according to the diluent used. Where the polymer produced is polyethylene and the diluent is an alkane for example isobutane it is preferred that the solids concentration is above 40 weight % for example in the range 40-60, preferably 45%-55 weight % based on the total weight of the slurry.

It is a particular feature of the present invention that operation of the slurry phase polymerisation at variable, preferably low Froude numbers enables the reactor to be run at high solids loading. A preferred embodiment of the present invention is a process comprising polymerising in a loop reactor an olefin monomer, in particular ethylene, optionally together with an olefin comonomer in the presence of a polymerisation catalyst in a diluent, particularly isobutane, to produce a slurry comprising solid particulate olefin polymer and the diluent wherein the Froude number in at least 20% of the length of the vertical sections of the reactor loop is less than 85% of the Froude number in at least 20% of the length of the horizontal sections of the loop The present invention is preferably carried out in larger diameter reactors than are conventionally used in slurry polymerisation. For example, reactors having average internal diameters over 500 millimeters, in particular over 600 for example between 600 and 750 millimetres are preferably used. A further advantage of this invention is therefore that high slurry concentrations at relatively low circulation velocities and/or relatively high reactor loop diameters can be achieved. A further embodiment of the present invention is a process comprising polymerising in a loop reactor an olefin monomer optionally together with an olefin comonomer in the presence of a polymerisation catalyst in a diluent to produce a slurry comprising solid particulate olefin polymer and the diluent wherein the Froude number in at least 20% of the length of the vertical sections of the reactor loop is less than 85% of the Froude number in at least 20% of the length of the horizontal sections of the loop and the average internal diameter of the reactor is in the range 600-750 millimeters.

The average internal diameters of the vertical sections can be the same, greater or less than, preferably greater than the average internal diameter of the horizontal sections. Typically the horizontal sections will have an average internal diameter in the range 500-700 millimetres for example in the range 600 to 650 millimetres. The vertical sections will typically have an average internal diameter in the range 600-900, for example 650-750 millimetres. The average internal diameter of each of the horizontal sections and each of the vertical sections can be the same or different. The internal diameter can remain the same or vary along a single horizontal or vertical section, preferably it remains the same. The average internal diameter of the vertical sections can be up to 900% for example 5-50 in particular 10-30% greater than the average internal diameter of the horizontal sections.

Vertical and horizontal shall be taken to mean substantially vertical and substantially horizontal respectively which for example will be not greater than 10 degrees preferably not greater than 5 degrees, from the geometric vertical and geometric horizontal respectively.

The polymerisation mixture or slurry (as defined above) is pumped around the relatively smooth-path endless loop reaction system at fluid velocities sufficient to (i) maintain the polymer in suspension in the slurry and (ii) to maintain acceptable cross-sectional concentration and solids loading gradients.

It has been found that vertical sections of reactor loops may be operated with Froude numbers in the vertical sections of the reactor that are significantly lower than the minimum required in the horizontal sections to maintain reliable reactor operations. Whilst the momentum transfer process to the pipe wall of particles relative to fluid is clearly significantly reduced in this case it has been found that acceptable heat transfer and heat transfer coefficients may still be maintained without affecting plant reliability.

The Froude number in the vertical sections is preferably maintained at between 15% and 85% of the minimum Froude number used in the horizontal sections. The Froude number in the vertical sections with upward circulation is preferably maintained at between 30% and 85% of the minimum Froude number used in the horizontal sections. Much lower relative Froude numbers are possible in the vertical sections with downward circulation. The Froude number in the vertical sections with downward circulation is preferably maintained at between 15% and 70% of the minimum Froude number used in the horizontal sections.

In one embodiment of the invention the Froude number in the horizontal sections of the loop is maintained below 30, preferably less than 20, most preferably less than 10 and the Froude number in the vertical sections is maintained below 20, preferably less than 10, most preferably below 5.

In a preferred embodiment of the invention the Froude number in at least 20% of the length of the vertical sections of the reactor loop with downward circulation is maintained at less than 85% of the Froude number present in at least 20% of the length of the vertical sections of the loop with upward circulation.

In an alternative embodiment of the invention at least 20% of the length of the vertical sections of the reactor loop have an internal cross-sectional area at least 5% greater than the largest internal cross-sectional area that covers at least 20% of the length of the horizontal sections of the loop.

In a further embodiment of the invention the Froude number in at least 20% of the length of the vertical sections of the reactor loop with downward circulation is maintained at less than 85% of the Froude number present in at least 20% of the length of the vertical sections of the loop with upward circulation.

Preferably the horizontal sections consist of no more than 20% of the reactor length and/or contribute no more than 20% of the reactor volume.

In a particular embodiment the downward flowing section is sized to maximise reactor volume and catalyst productivity, even though the heat transfer coefficient in this case may not be as high as normally expected. In this case the circulation rate in the downward flowing vertical sections can even be less than the minimum settling velocity of the particles in the reactor. In a preferred embodiment the Froude number in the downward flowing vertical sections is maintained at between 1 and 5, preferably between 1 and 3. Although the total reactor length in this case may be higher than would otherwise be needed from purely heat transfer considerations, it has been found that this design methodology leads to a new optimum design point that balances catalyst productivity and pump power.

As reactor diameter for a fixed reactor volume increases so the available heat transfer area decreases. A further advantage of this invention is that it has been found that high slurry concentrations can be tolerated in large diameter reactors at relatively low circulation velocities, as circulation velocities decrease so too does heat transfer coefficient (all other things being equal). When employing the full advantages of this invention any reactor design is more likely to be heat transfer limited than catalyst productivity or space time yield limited, this means that lower catalyst residuals can be achieved than in an equivalent reactor designed by prior art methods.

It has been found that reactors can be designed and operated at specific pressure drop both per unit reactor length and per mass of polymer and total pressure drop for the loop less than that taught as being required at high solids loadings in the prior art. This invention permits total loop pressure drops of less than 1.3 bar, typically less than 1 bar, preferably less than 0.8 bar even for polymer production rates of above 25, even above 45 tonnes per hour. It is possible to employ one pump or more than one pump in the loop preferably on one or more horizontal sections; these can be located on the same horizontal section or on different sections. The pump or pumps can be of the same diameter or larger or smaller diameter preferably of the same diameter as the internal diameter of the section of the reactor where the pump or pumps are located. It is preferable to employ a single pump and it is a feature of the present invention that requirements for number and power of pump(s) is less onerous than for conventional processes.

Reactor size is typically over 20 m$^3$ in particular over 50 m$^3$ for example 75-150 m$^3$ preferably in the range 100-125 m$^3$ The ability to operate at low Froude numbers in the vertical sections enables larger reactor diameters to be considered and enables reactor volumes, for example of greater than 80 m$^3$ to be built with reactor length to average internal diameter ratios of less than 500, preferably less than 300 for example less than 250. Reduction in reactor length to average internal diameter ratio minimises compositional gradients around the reaction loop and enables production rates of greater than 25 te/hr for example greater than 40 te/hr per reactor to be achieved with only a single point of reagent introduction around the reaction loop. Alternatively it is possible to have multiple inlets into the loop reactor for reactants (e.g. olefins), catalyst, or other additives.

In a preferred embodiment of the invention the loop is designed so that the Froude number in any vertical section of the loop within 5 pipe diameters, preferably 10, most preferably 15 pipe diameters upstream of a horizontal section of the loop is maintained at no less than 90%, preferably about 100%, of the Froude number in that horizontal section of pipe. This is to ensure that the fluid has reached approximately the same conditions as in the horizontal section before entering the horizontal section.

The pressure employed in the loop is sufficient to maintain the reaction system 'liquid full' i.e the diluent and reagents (i.e. monomers and chain terminators) substantially in a liquid phase, normally pressures used are between 1-100 bara, preferably between 30 to 50 bara. In ethylene polymerization the ethylene partial pressure is most often chosen from 0.1 to 5 MPa, preferably from 0.2 to 2 MPa, more particularly from 0.4 to 1.5 MPa. The temperatures selected are such that substantially all of the polymer produced is essentially (i) in non-tacky and non-agglomerative solid particulate form and (ii) insoluble in the diluent. The polymerization temperature depends on the hydrocarbon diluent chosen and the polymer being produced. In ethylene polymerisation it is generally below 130 C, typically between 50 and 125 C, preferably between 75 and 115 C. For example in ethylene polymerisation in isobutane diluent, the pressure employed in the loop is preferably in the range 30-50 bara, the ethylene partial pressure is preferably in the range 0.2-2 MPa and the polymerisation temperature is in the range 75-115 C. The space time yield which is production rate of polymer per unit of loop reactor volume for the process of the present invention is in the range 0.1-0.4 preferably 0.2-0.35 ton/hour/m$^3$.

The process according to the invention applies to the preparation of compositions containing olefin (preferably ethylene) polymers which can comprise one or a number of olefin homo-polymers and/or one or a number of copolymers. The process according to the invention is particularly suited to the manufacture of ethylene and propylene polymers. Ethylene copolymers typically comprise an alpha-olefin in a variable amount which can reach 12% by weight, preferably from 0.5 to 6% by weight, for example approximately 1% by weight.

The alpha mono-olefin monomers generally employed in such reactions are one or more 1-olefins having up to 8 carbon atoms per molecule and no branching nearer the double bond than the 4-position. Typical examples include ethylene, propylene, butene-1, pentene-1, and octene-1, and mixtures such as ethylene and butene-1 or ethylene and hexene-1. Butene-1, pentene-1 and hexene-1 are particularly preferred comonomers for ethylene copolymerisation.

Typical diluents employed in such alpha-monoolefin polymerizations include hydrocarbons having 3 to 12, preferably 3 to 8, carbon atoms per molecule, such as linear alkanes such as propane, n-butane, n-hexane and n-heptane, or branched alkanes such as isobutane, isopentane, toluene, isooctane and 2,2,-dimethylpropane, or cycloalkanes such as cyclopentane and cyclohexane or their mixtures. In the case of ethylene polymerization, the diluent is generally inert with respect to the catalyst, cocatalyst and polymer produced (such as liquid aliphatic, cycloaliphatic and aromatic hydrocarbons), at a temperature such that at least 50% (preferably at least 70%) of the polymer formed is insoluble therein. Isobutane is particularly preferred as the suspending medium for ethylene polymerisation The operating conditions can also be such that the monomers (eg ethylene, propylene) act as the principal suspending medium or diluent as is the case in so called bulk polymerisation processes. The slurry concentration limits in volume percent have been found to be able to be applied independently of molecular weight of suspension medium and whether the suspension medium is inert or reactive, liquid or supercritical. Propylene monomer is particularly preferred as the diluent for propylene polymerisation.

Methods of molecular weight regulation are known in the art and need not be described in detail. When using Ziegler-Natta, metallocene and tridentate late transition metal type catalysts, hydrogen is preferably used, a higher hydrogen pressure resulting in a lower average molecular weight. When using chromium type catalysts, polymerization temperature is preferably used to regulate molecular weight.

In commercial plants, the particulate polymer is separated from the diluent in a manner such that the diluent is not exposed to contamination so as to permit recycle of the diluent to the polymerization zone with minimal if any purification. Separating the particulate polymer produced using the process of the present invention from the diluent typically can be by any method known in the art for example it can involve either (i) the use of discontinuous vertical settling legs such that the flow of slurry across the opening thereof provides a zone where the polymer particles can settle to some extent from the diluent or (ii) continuous product withdrawal. via a single or multiple withdrawal ports, the location of which can be anywhere on the loop reactor but is preferably adjacent to the downstream end of a horizontal section of the loop. Any continuous withdrawal ports will typically have an internal diameter in the range 2-25, preferably 4-15, especially 5-10 cm Use of concentrating devices on the withdrawn polymer slurry, preferably hydrocylones (single or in the case of multiple hydrocyclones in parallel or series), further enhances the recovery of diluent in an energy efficient manner since significant pressure reduction and vaporisation of recovered diluent is avoided It has been found that both the slurry concentration and the minimum acceptable Froude number in the reactor loop can be optimised by controlling the average particle size and/or the particle size distribution of the powder within the reactor loop. The principal determinant of the average particle size of the powder is the residence time in the reactor. The particle size distribution of the catalyst can be affected by many factors including the particle size distribution of the catalyst fed to the reactor, the initial and average catalyst activity, the robustness of the catalyst support and susceptibility of the powder to fragment under reaction conditions. Solids separating devices (such as hydrocyclones) can be used on the slurry withdrawn from the reactor loop to further assist in control of the average particle size and the particle size distribution of the powder in the reactor. The location of the withdrawal point for the concentrating device and the design and operating conditions of the concentrating device system, preferably the at least one hydrocyclone recycle loop, also enables the particle size and particle size distribution within the reactor to be controlled. The average particle size is preferable between 100 and 1500 microns, most preferably between 250 and 1000 microns.

The withdrawn, and preferably concentrated, polymer slurry is depressurised, and optionally heated, prior to introduction into a primary flash vessel. The stream is preferably heated after depressurisation.

The diluent and any monomer vapors recovered in the primary flash vessel are typically condensed, preferably without recompression and reused in the polymerization process. The pressure of the primary flash vessel is preferably controlled to enable condensation with a readily available cooling medium (eg cooling water) of essentially all of the flash vapour prior to any recompression, typically such pressure in said primary flash vessel will be 4-25 for example 10-20, preferably 15-17 bara. The solids recovered from the primary flash vessel is preferably passed to a secondary flash vessel to remove residual volatiles. Alternatively the slurry may be passed to a flash vessel of lower pressure than in the above mentioned primary vessel such that recompression needed to condense the recovered diluent. Use of a high pressure flash vessel is preferred. The process according to the invention can be used to produce resins which exhibit specific density in the range 0.890 to 0.930 (low density), 0.930 to 0.940 (medium density) or 0.940 to 0.970 (high density).

The process according to the invention is relevant to all olefin polymerisation catalyst systems, particularly those chosen from the Ziegler-type catalysts, in particular those derived from titanium, zirconium or vanadium and from thermally activated silica or inorganic supported chromium oxide catalysts and from metallocene-type catalysts, metallocene being a cyclopentadienyl derivative of a transition metal, in particular of titanium or zirconium.

Non-limiting examples of Ziegler-type catalysts are the compounds comprising a transition metal chosen from groups IIIB, IVB, VB or VIB of the periodic table, magnesium and a halogen obtained by mixing a magnesium compound with a compound of the transition metal and a halogenated compound. The halogen can optionally form an integral part of the magnesium compound or of the transition metal compound.

Metallocene-type catalysts may be metallocenes activated by either an alumoxane or by an ionizing agent as described, for example, in Patent Application EP-500,944-A1 (Mitsui Toatsu Chemicals).

Ziegler-type catalysts are most preferred. Among these, particular examples include at least one transition metal chosen from groups IIIB, IVB, VB and VIB, magnesium and at least one halogen. Good results are obtained with those comprising: from 10 to 30% by weight of transition metal, preferably from 15 to 20% by weight, from 20 to 60% by weight of halogen, the values from 30 to 50% by weight being preferred, from 0.5 to 20% by weight of magnesium, usually from 1 to 10% by weight, from 0.1 to 10% by weight of aluminium, generally from 0.5 to 5% by weight, the balance generally consists of elements arising from the products used for their manufacture, such as carbon, hydrogen and oxygen. The transition metal and the halogen are preferably titanium and chlorine.

Polymerizations, particularly Ziegler catalysed ones, are typically carried out in the presence of a cocatalyst. It is possible to use any cocatalyst known in the art, especially compounds comprising at least one aluminium-carbon chemical bond, such as optionally halogenated organoaluminium compounds, which can comprise oxygen or an element from group I of the periodic table, and aluminoxanes. Particular examples would be organoaluminum compounds, of trialkylaluminiums such as triethylaluminium, trialkenylaluminiums such as triisopropenylaluminium, aluminium mono- and dialkoxides such as diethylaluminium ethoxide, mono- and dihalogenated alkylaluminiums such as diethylaluminium chloride, alkylaluminium mono- and dihydrides such as dibutylaluminium hydride and organoaluminium compounds comprising lithium such as $LiAl(C_2H_5)_4$. Organoaluminium compounds, especially those which are not halogenated, are well suited. Triethylaluminium and triisobutylaluminium are especially advantageous.

The chromium-based catalyst is preferred to comprise a supported chromium oxide catalyst having a titania-containing support, for example a composite silica and titania support. A particularly preferred chromium-based catalyst may comprise from 0.5 to 5 wt % chromium, preferably around 1 wt % chromium, such as 0.9 wt % chromium based on the weight of the chromium-containing catalyst. The support comprises at least 2 wt % titanium, preferably around 2 to 3 wt % titanium, more preferably around 2.3 wt % titanium based on the weight of the chromium containing catalyst. The chromium-based catalyst may have a specific surface area of from 200 to 700 m.sup.2/g, preferably from 400 to 550 m.sup.2/g and a volume porosity of greater than 2 cc/g preferably from 2 to 3 cc/g.

Silica supported chromium catalysts are typically subjected to an initial activation step in air at an elevated activation temperature. The activation temperature preferably ranges from 500 to 850.degree. C., more preferably 600 to 750.degree. C.

The reactor loop is preferably used to make multi-modal polymers. The multi-modal polymers being made in a single reactor or in multiple reactors. The reactor loop can comprise one or more loop reactors connected in series or in parallel. The reactor loop may also be preceded or followed by a polymerisation reactor that is not a loop reactor.

In the case of series reactors, the first reactor of the series is supplied with the catalyst and the cocatalyst, and each subsequent reactor is supplied with, at least, ethylene and with the slurry arising from the preceding reactor of the series, this mixture comprising the catalyst, the cocatalyst and a mixture of the polymers produced in the preceding reactors of the series. It is optionally possible to supply the second reactor and/or, if appropriate, at least one of the following reactors with fresh catalyst and/or cocatalyst. However, it is preferable to introduce the catalyst and the cocatalyst exclusively into the first reactor.

In the case where the plant comprises more than two reactors in series, the polymer of highest melt index and the polymer of lowest melt index can be produced in two adjacent or non-adjacent reactors in the series. Hydrogen is maintained at (i) a low (or zero) concentration in the reactor(s) manufacturing the high molecular weight components, e.g. hydrogen percentages including between 0-0.1 vol % and at (ii) a very high concentration in the reactor(s) manufacturing the low molecular weight components e.g. hydrogen percentages between 0.5-2.4 vol %. The reactors can equally be operated to produce essentially the same polymer melt index in successive reactors.

Particular sensitivity to increasing reactor diameters (and associated cross-sectional compositional, thermal or particulate gradients) has however been to related to production of polymer resins where polymer of either high or low molecular weight resins has been known to lead to increased fouling concerns. Particularly when producing polymers of molecular weights less than 50 kDaltons or greater than 150 kDa. These concerns have particularly been confirmed to be accentuated at low polymer solids concentrations in the reactor loop. When producing polymers of molecular weights less than 50 kDaltons or greater than 200 kDa (or melt index below 0.1 and above 50) in large diameter reactors it has however surprisingly been discovered that fouling is decreased when solids loadings are increased to above 20 vol %, particularly above 30 vol %.

The invention claimed is:

1. A process comprising polymerising an olefin monomer optionally together with an olefin comonomer in the presence of a polymerization catalyst in a diluent in a loop reactor which comprises at least 2 horizontal sections and at least 2 vertical sections to produce a slurry comprising solid particulate olefin polymer and the diluent wherein the Froude number in at least 20% of the length of the vertical sections of the reactor loop is less than 85% of the Froude number in at least 20% of the length of the horizontal sections of the loop.

2. A process claimed in claim 1 wherein the average Froude number in the loop reactor is maintained at or below 20.

3. A process as claimed in claim 2 wherein the average Froude number in the loop reactor is maintained in the range 10 to 3.

4. A process as claimed in claim 1 wherein the Froude number in the vertical sections of the loop reactor with upward circulation is maintained at between 30 and 85% of the minimum Froude number used in the horizontal sections.

5. A process as claimed in claim 1 wherein the Froude number in the vertical sections of the loop reactor with downward circulation is maintained at between 15 to 70% of the minimum Froude number used in the horizontal sections.

6. A process as claimed in claim 1 wherein the Froude number in the horizontal sections is maintained below 30.

7. A process as. claimed in claim 1 wherein the Froude number in the vertical sections is maintained below 20.

8. A process as claimed in claim 1 wherein the horizontal sections of the loop reactor consist of no more than 20% of the total reactor length.

9. A process as claimed in claim 1 wherein the total loop pressure drops by less than 1.3 bar.

10. A process as claimed in claim 1 wherein the reactor size is over 50 m$^3$.

11. A process as claimed in claim 1 wherein the average internal diameter of the loop reactor is over 300 millimeters.

12. A process as claimed in claim 11 wherein the average internal diameter of the loop reactor is in the range 600 to 750 millimeters.

13. A process as claimed in claim 1 wherein the ratio of the reactor length to the average internal diameter of the loop reactor is less than 500.

14. A loop reactor of a continuous tubular construction comprising at least two horizontal sections and at least two vertical sections wherein the internal cross sectional area of at least 20% of the vertical sections is at least 5% greater than the largest internal cross sectional area that covers at least 20% of the horizontal sections, wherein the average internal diameter of the horizontal sections is in the range 500-700 millimeters and the average internal diameter of the vertical section is in the range 600-900 millimeters.

15. A process as claimed in claim 13 wherein the ratio of the reactor length to the average internal diameter of the loop reactor is less than 250.

* * * * *